United States Patent [19]

Fukuchi

[11] Patent Number: 5,684,553
[45] Date of Patent: Nov. 4, 1997

[54] METHOD FOR MANUFACTURING COLOR FILTER AND MULTIPLE COLOR LIQUID CRYSTAL DISPLAY DEVICES

[75] Inventor: Takakazu Fukuchi, Chiba, Japan

[73] Assignee: Seiko Instruments Inc., Japan

[21] Appl. No.: 395,442

[22] Filed: Feb. 28, 1995

[30] Foreign Application Priority Data

Mar. 1, 1994 [JP] Japan .................................. 6-031625
Jul. 4, 1994 [JP] Japan .................................. 6-152440

[51] Int. Cl.$^6$ ...................... G02F 1/1333; G02F 1/1335
[52] U.S. Cl. ........................................... 349/110; 349/106
[58] Field of Search ........................... 359/68, 67, 87; 349/110, 106, 139, 143

[56] References Cited

U.S. PATENT DOCUMENTS

| | | | |
|---|---|---|---|
| 4,006,968 | 2/1977 | Ernstoff et al. | 359/68 |
| 4,828,363 | 5/1989 | Yamazaki | 359/68 |
| 5,142,392 | 8/1992 | Ueki et al. | 359/67 |
| 5,340,619 | 8/1994 | Chen et al. | 424/498 |
| 5,367,393 | 11/1994 | Ohara et al. | 359/67 |
| 5,508,134 | 4/1996 | Shirai | 359/67 |

FOREIGN PATENT DOCUMENTS

| | | | |
|---|---|---|---|
| 224-040-A | 9/1987 | European Pat. Off. | 359/68 |
| 0317063 | 5/1989 | European Pat. Off. | |
| 0501657 | 9/1992 | European Pat. Off. | |
| 1-138530 | 5/1989 | Japan | 359/68 |
| 4-301604 | 10/1992 | Japan | 359/68 |

OTHER PUBLICATIONS

1989 SID International Digest Symposium, Digest of Technical Papers, vol. 20, May 16–18, 1989, Baltimore, MD, pp. 378–381, 438, S. Yamauchi et al., "Homeotropic–Alignment Full–Color LCD".

Displays, vol. 14, No. 2, 1993, Jordan Hill, GB, pp. 115–124, K. Tsuda, "Colour Filters for LCDs".

*Primary Examiner*—William L. Sikes
*Assistant Examiner*—Tsep H. Nguyen
*Attorney, Agent, or Firm*—Adam & Wilks

[57] ABSTRACT

A method of manufacturing a color filter comprises forming first transparent electrodes on a substrate. Colored layers are then formed on the first transparent electrodes followed by second transparent electrodes being formed over the colored layers. Thereafter, predetermined portions of the colored layers and the second transparent electrodes are removed by, for example, a laser such that gaps exist between the colored layers. Finally, a light shielding film is formed in a lattice pattern over the second transparent electrodes and in the gaps between the colored layers. By removing selected portions of the colored layers and the second transparent electrodes prior to forming the light shielding film, a color filter is provided with a lattice-shaped light shielding film which can be used in color liquid crystal display devices employing thin film transistors.

24 Claims, 8 Drawing Sheets

PRIOR ART

METHOD FOR MANUFACTURING COLOR FILTER AND MULTIPLE COLOR LIQUID CRYSTAL DISPLAY DEVICES

BACKGROUND OF THE INVENTION

The present invention relates to a method for manufacturing multiple color liquid crystal display devices employing color filters, and particularly to a method for manufacturing multiple color liquid crystal display devices wherein the color filters are high-polymer electrodeposited color filters.

Figure 1A:
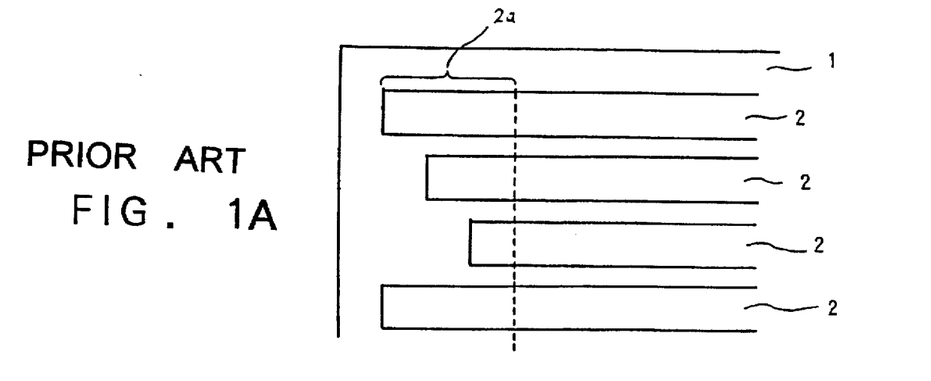
FIG. 1A to 1D are schematic diagrams showing manufacturing steps for forming electrodeposited color filters in the prior art.
Figure 1B:
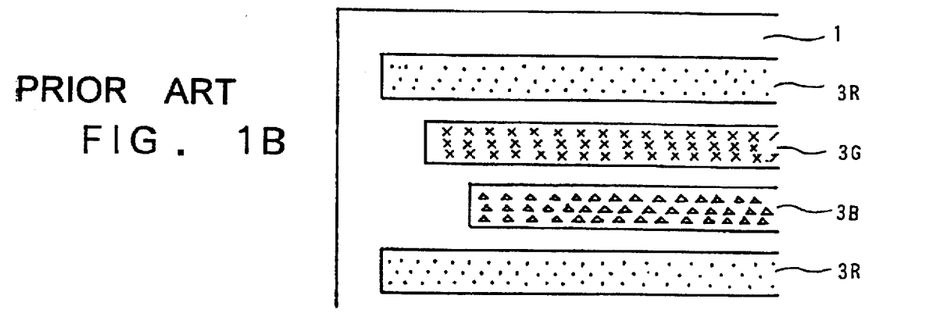
Figure 1C:
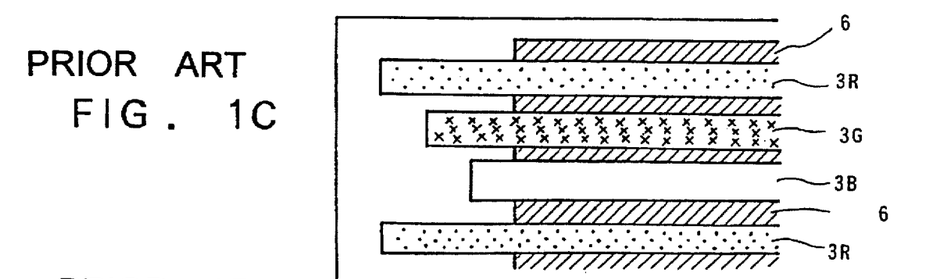
Figure 1D:
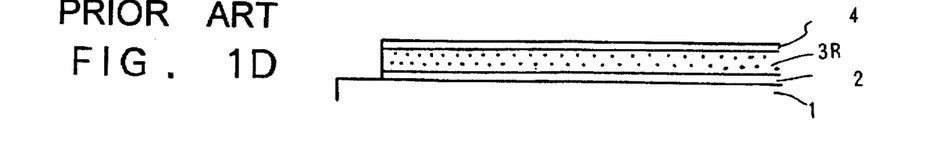

FIG. 1a shows a prior art method for manufacturing color filters by means of a high-polymer electrodeposition method. FIG. 1A shows a glass substrate 1 having a plurality of transparent electrodes 2, whereon color rendering layers are formed successively on the transparent electrodes 2 by using color rendering terminals 2a. While details of a method of manufacturing color filters by means of the high-polymer electrodeposition method are described in Japanese Unexamined Patent Publication No. 59-114572, a summary thereof will be described below.

First, other methods for manufacturing color filters will be briefly described below. Methods for manufacturing color filters include, in addition to the high-polymer electrodeposition method (hereafter referred to as electrodeposition method), a dyeing method, a pigment dispersion method and a printing method. In the dyeing method, a dye matrix material is applied onto a glass substrate whereon a desired pattern is formed by photolithography and then dyed by using a dye, where the process is repeated three times in the case of a color filter having three primary colors, R, G, and B. In the pigment dispersion method, a colored photosensitive resin prepared by dispersing a pigment in a high-polymer matrix, a so-called photosensitive resin, which includes a reactive agent being added thereto in advance, is applied to a glass substrate whereon a desired pattern is formed by photolithography to thereby fabricate the color filter. This process is repeated three times in the case of a color filter having three primary colors, R, G, and B, similarly to the case for the dyeing method.

In the printing method, a desired pattern is printed on a glass substrate by means of a printing technology, such as offset printing, using a colored, high-polymer material prepared by mixing a high-polymer material and a pigment as ink. This process is repeated three times in the case of a color filter having three primary colors, R, G, and B, similarly to the case for the dyeing method, thereby forming a printed color filter.

The high-polymer electrodeposition method is, as described previously, a method for forming color filters by successive electrodeposition of color filters 3R, 3G and 3B on transparent electrodes 2 which have been patterned in advance as shown in FIG. 1A. While photolithography technology is employed for the transparent electrode pattern 2, it is carried out on a glass substrate before forming the color filter and, therefore, it can be fabricated with no influence on the positioning accuracy of the color filter. This is because the color filters 3R, 3G and 3B are formed by the electrodeposition method on the transparent electrode pattern 2, and therefore positioning accuracy of the color filter is determined by the positioning accuracy of the patterning carried out in advance. This method is characterized by its capability of forming color filter patterns through so-called self-alignment.

Color filters usually have light shielding films formed between different colors. For manufacturing the light shielding films, different methods are employed depending on the method of manufacturing the color filters. In the case of the dyeing method, the pigment dispersion method and the printing method, a metal film such as chromium is formed by a film forming method such as sputtering before forming the color filter, and then a desired light shielding film pattern is made by photolithography. Another method of forming a light shielding film is widely practiced wherein color filters of two colors disposed adjacent to each other without using metal film are laminated, thereby reducing the transmittance to light and providing a substitute for the light shielding film. The former method is employed in color LCD (Liquid Crystal Display) of active matrix type such as TFT (Thin Film Transistor) which suffers from deterioration of the characteristics due to leakage of light. The latter method is employed for less expensive TN (Twisted Nematic) or STN (Super Twisted Nematic) LCD.

These light shielding films have fewer restrictions in the pattern configuration by means of exposure masks prepared in advance, because the light shielding films are fabricated by the photolithography method. The configuration of the light shielding film, whether of a lattice shape or stripes, can be selected as required. In the electrodeposition method, an electrodeposited color filter is formed first as shown in FIG. 1, then a light shielding film is formed by a back exposure method using the color filter as the mask. This method has such an advantage that the light shielding film can be formed by self-alignment similarly to the case of the color filter, because the electrodeposited color filter can be used as a mask. However, as the color filter is formed on the transparent electrodes which have been patterned beforehand, the light shielding film can be formed only in the gaps of the color filter. It has another characteristic of lower degree in the configuration of the light shielding film.

Figure 2A:
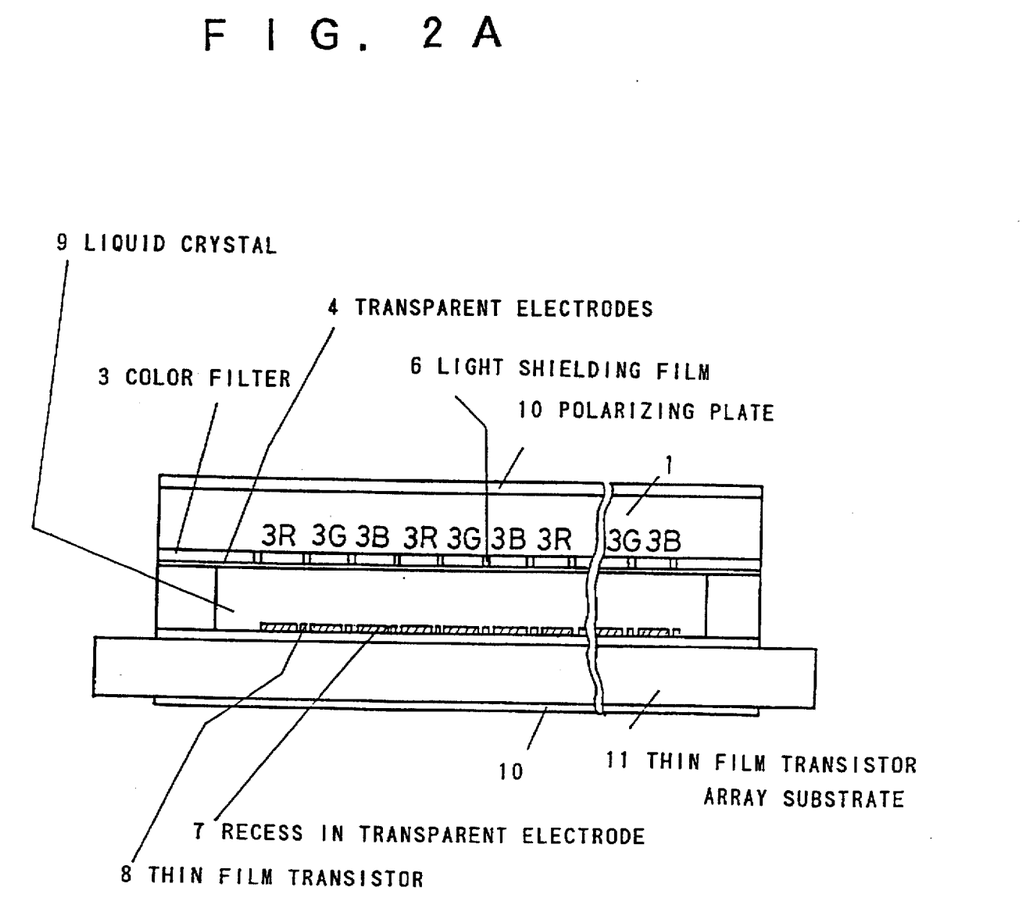
FIG. 2A shows a schematic sectional view of a multiple color liquid crystal display device using the TFT of the prior art and the invention.
Figure 2B:
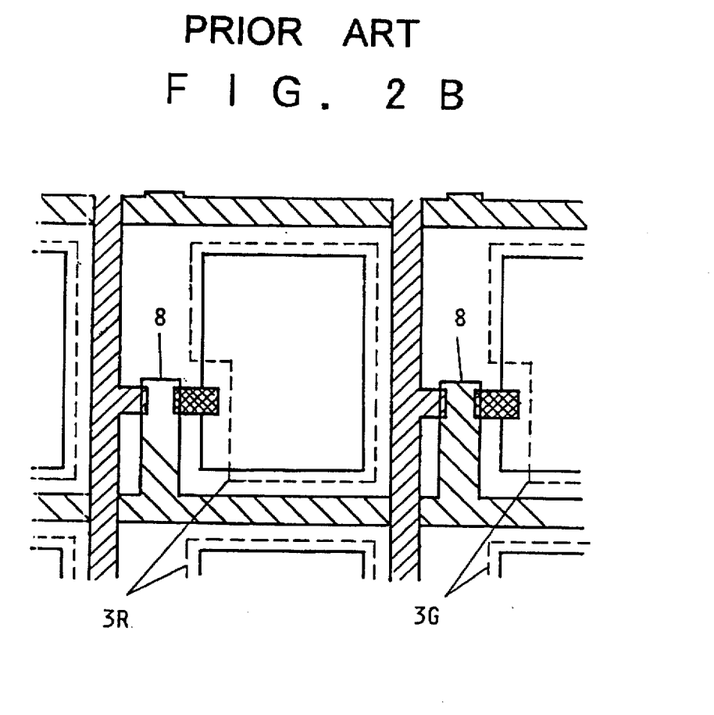
FIG. 2B is a schematic plan view explaining the TFT substrate.
Figure 2C:
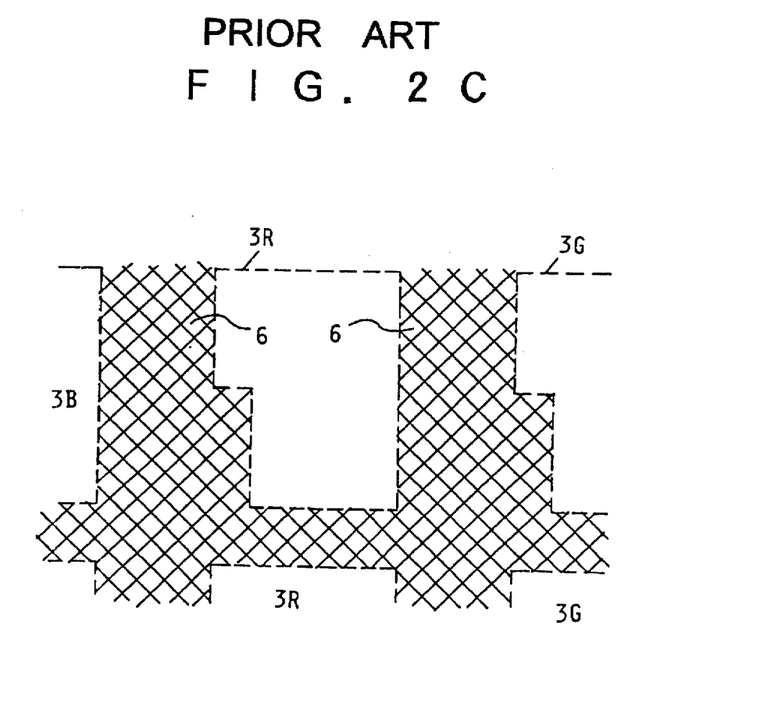
FIG. 2C is a schematic plan view showing the light shielding film on the TFT substrate of 2B.

A multiple color liquid crystal display device using these color filters will now be described below. FIG. 2 shows a schematic sectional drawing of a prior art color LCD of the TFT type FIG. 2A shows a color filter substrate 1 disposed to oppose, via a liquid crystal layer 9, transparent electrodes 7 and TFT 8 which are formed on a TFT array substrate 11. FIG. 2B is an enlarged drawing of a portion of the TFT array substrate 11 showing the positional relationship between the TFT 8, a color filter 3 and a light shielding film 6. FIG. 2C shows only a portion of the color filter located at the same position as the portion enclosed by dashed line in FIG. 2B. From these drawings it can be seen that the TFT 8 is covered by the light shielding film 6. In order to prevent light from leaking from portions other than a display region of the color filter 3, light shielding films crossing the color filters 3R, 3G, 3B at right angles are also provided in addition to those provided in the gaps between the color filters 3R, 3G, 3B, in order to form the light shielding films in a lattice configuration.

The light shielding film 6 generally plays a role of protecting the TFT 8 elements from deterioration of characteristics due to exposure to light (hereafter referred to as light leakage). Light leakage refers to such a reaction as when a thin film of amorphous silicon formed on the TFT 8 elements is exposed to light of a certain intensity the resistance of the amorphous silicon is reduced causing a leakage in voltage which has been retained by the transparent display electrode 7. When this light leakage occurs the, potential difference between the transparent electrode 4 and the transparent display electrode 7 decreases below the threshold voltage of the liquid crystal 9 causing the liquid crystal 9 to be uncontrollable and leading to display failure.

SUMMARY OF THE INVENTION

Although the electrodeposited color filter has a such merit that the color filter and the light shielding film can be fabricated easily by self-alignment, this merit in turn causes a problem of inability to form lattice-shaped light shielding film suited to an active matrix LCD which is subject to deterioration of the characteristics due to light leakage of the TFT.

The reason for this problem is that the color filter becomes continuous stripes because of the presence of the transparent electrode pattern 2 which is indispensable in forming the electrodeposited color filter as shown in FIG. 1. Consequently, the configuration of the light shielding film 6 fabricated in the gaps of the color filter by the back exposure method is also formed in a configuration of stripes.

Figure 3:
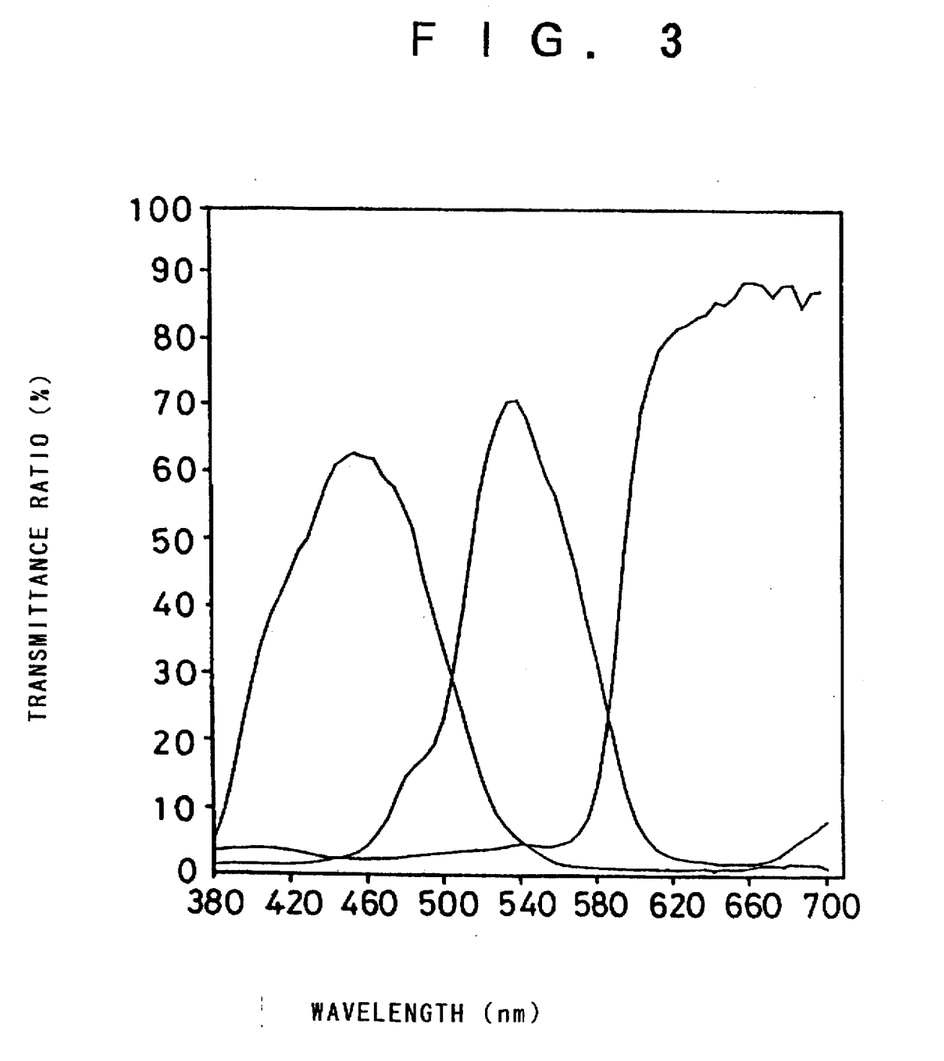
FIG. 3 shows an example of a spectral characteristic of an electrodeposited color filter.

Spectral characteristics of the electrodeposited color filters of three colors, red, green and blue, are shown in FIG. 3. From the spectral characteristics the, intensity level of the transmitted light can be understood. When a lattice-shaped light shielding film is not provided, light transmitting through the liquid crystal layer 9 is irradiated on the TFT elements as shown in FIG. 2A, thereby causing a problem of deterioration of the TFT element characteristics.

According to the present invention, a method of removing a part of a color filter formed by the high-polymer electrodeposition method before forming a light shielding film is employed, to form a color filter provided with a lattice-shaped light shielding film which can be used in TFT-LCD.

According to the present invention, it has been concluded that the most effective means for removing a part of the electrodeposited color filter is to use a laser. The reasons for this conclusion are the fact that the positioning accuracy of the color filter and the light shielding film used in the TFT-LCD is as high as within ±b 10micrometers, and that a surface smoothness as high as ±0.15 micrometers is required for the color filter surface after removing part of the electrodeposited color filter. A color filter which does not satisfy at least these two requirements cannot be used for TFT-LCD.

Although there are various methods for removing part of the electrodeposited color filter other than the use of a laser, such as a mechanical cutting method a, sand blast method and a chemical processing method (alkali solution, for example), none of these methods were able to satisfy the two requirements described above. The mechanical cutting method caused a rough surface and the sand blast method has such problems as that inability to machine fine patterns. The chemical processing failed to remove the color filter uniformly.

When removing part of an electrodeposited color filter by using a laser, the positioning accuracy is maintained within ±10 micrometers by the use of a drive table having high accuracy. The high accuracy drive table may be one driven by a stepper motor used in an exposure device or one driven by a linear motor for high-speed drive.

When an electrodeposited color filter is removed by the irradiation of laser energy, the color filter layer and the transparent electrodes for the formation of the color filter to be removed are evaporated and dispersed instantaneously, and therefore it causes only an extremely small amount of contamination of the surface. Removal by means of laser is also possible in case a protective resin or a transparent electrode formed on the color filter exists. In order to completely prevent the surface from being affected by the scattered material which is removed by the laser energy, a local suction device may be installed near the portion of the color filter surface irradiated with the laser.

Any kind of laser may be used, such as a YAG laser, rare gas lasers including xenon laser and He—Ne laser, and excimer, as far as it can remove the color filter and the transparent electrode. Thus it has been made possible to manufacture electrodeposited color filters having lattice-shaped light shielding films which can be used in TFT-LCD by removing a part of the electrodeposited color filter by a laser in advance before the process of forming a light shielding film.

The method for manufacturing color filters in the multiple color liquid crystal display device of the invention described above comprises at least the following processes:

a process of patterning transparent electrodes;

a process of forming colored layers on the respective patterned transparent electrodes;

a process of forming a transparent electrode on the color filter;

a process of removing part of the color filter and part of the transparent electrode; and a process of forming a light shielding film,

DETAILED DESCRIPTION OF THE PREFERRED EMBODIMENTS

Details of the invention will be described in detail below with reference to the drawings.

(Embodiment 1)

Figure 4:
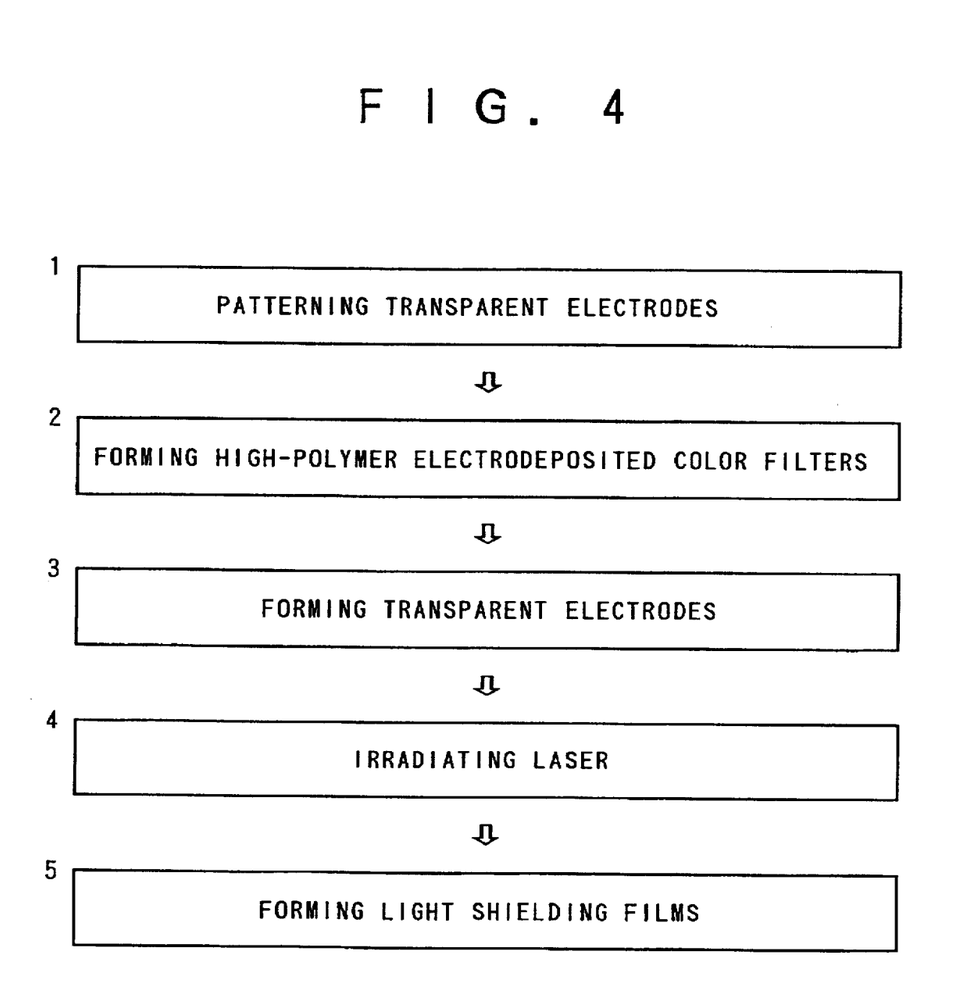
FIG. 4 is a flow chart showing a method for manufacturing color filters used in the invention.
Figure 5A:
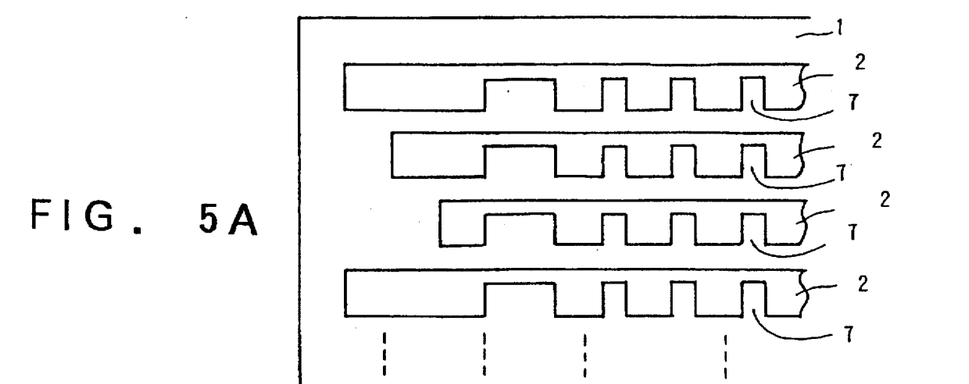
FIG. 5A to 5D are schematic diagram showing the manufacturing steps of the invention.

FIG. 4 shows a flow chart of each manufacturing step in one embodiment of the method of manufacturing color filters according to the invention. FIG. 5 shows a schematic diagram for each manufacturing step of the flow chart shown in FIG. 4. First, a pattern of transparent electrodes is formed (patterning) on which is formed a color filter by means of a high-polymer electrodeposition method (electrodeposited color filter) as shown in FIG. 5A on a glass substrate whereon transparent electrodes are disposed. This patterning process was carried out by means of a photolithography process commonly employed. The transparent electrodes were made of indium-tin (ITO) films which were formed by sputtering to obtain a sheet resistance of 15Ω/□ and a film thickness of 1500 Angstrom.

Numeral 1 in FIG. 5A indicates a glass substrate and numeral 2 indicates a transparent electrode pattern. The transparent electrode patterns are formed with the length of every third transparent electrode pattern 2 being different, so that the color filters of three colors, red, green and blue can be formed successively. While the transparent electrode pattern 2 is disposed to extend straight up to other end of the glass substrate, recesses are provided at constant intervals as indicated by numeral 7 in FIG. 5A. The interval of the recesses 7 is made to be the same as the interval of pixels of the TFT-LCD used in the multiple color crystal display device of the invention, and the area of the recess 7 is made to be equal to or greater than the area of the TFT element on the TFT substrate side.

Figure 5B:
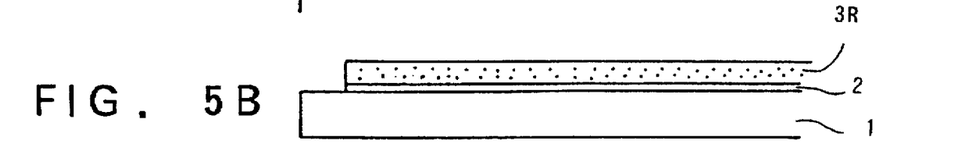

Then the color filters of three colors, red, green and blue, are electrodeposited on the transparent electrode pattern 2. FIG. 5B shows a schematic sectional diagram in case the electrodeposited color filter 3R is provided on the transparent electrode pattern 2. The electrodeposited color filters 3R, 3G and 3B are made to have the same thickness of 1.5 micrometers.

Figure 5C:
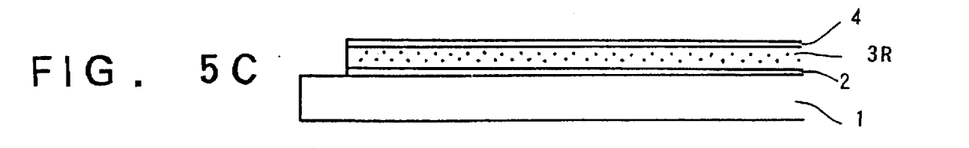

FIG. 5C shows the glass substrate with the electrodeposited color filters 3R, 3G and 3B having been formed over the entire surface thereof whereon a transparent electrode 4 is formed by sputtering. The transparent electrode 4 has a sheet resistance of 50Ω/□ and a film thickness of 1000 Angstrom. Then part of the electrodeposited color filters 3R, 3G and 3B and part of the transparent electrode 4 were removed by means of a YAG laser (LR-230 made by the HOYA). The part removed by laser is the portions of the transparent electrode pattern 2 which are made narrower and disposed at constant intervals as shown in FIG. 5A. The depth of removal can be controlled to some extent by adjusting the output of the YAG laser. In the case of the invention, at least the transparent electrode 4 and the electrodeposited color filters 3R, 3G and 3B must be removed. It is preferable also to remove the transparent electrode 2 for the formation of the electrodeposited color filter. This is because residue of the transparent electrode pattern 2 decreases the light shielding performance of the light shielding film to be formed in the next step. Because the electrodeposited color filter and the transparent electrode to be removed by the YAG laser are evaporated and scattered into the surrounding atmosphere instantaneously, a suction device was installed near the portion irradiated with the laser beam in order to prevent the evaporated material from contaminating the glass substrate surface. The shape of the recesses 7 in the transparent electrode pattern 2 described previously has an effect of reducing the amount to be removed by the laser. The surface of the glass substrate 1 received no damage at all.

Figure 5D:
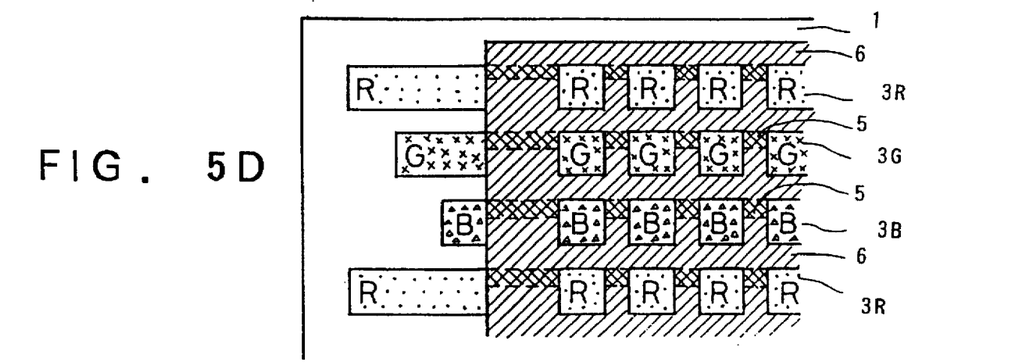

Thereafter the surfaces of the electrodeposited color filters 3R, 3G and 3B and of the transparent electrode 4 which have been processed with laser were coated with a black resist by screen printing. A photosensitive resin with black pigment including carbon being dispersed therein was used for the black resist. The photosensitive resin may be a negative resist which reacts to ultraviolet light irradiated from the back of the glass substrate 1 (back exposure) in consideration of the spectral characteristic of the electrodeposited color filters 3R, 3G and 3B. OFPR800 made by Tokyo Ouka, a photoresist made by Nippon Kayaku and one made by Fuji Hunt may be used. Because the glass substrate presents a certain transmittance to ultraviolet light having a wavelength of 365 nanometers and the electrodeposited color filters 3R, 3G and 3B absorb most of the ultraviolet light, the black resist in the gaps of the electrodeposited color filters is light-hardened and is therefore formed as a light shielding film. The film thickness of the light shielding film 6 is set to 1.5 micrometers similarly to the electrodeposited color filter. At this time, it is common to form the light shielding film not only in the gaps of the electrodeposited color filters but also around them as shown in FIG. 5D.

The light shielding film was made by adjusting the optical density (OD value) of the black resist to 2.5 or higher in order to prevent the TFT characteristics from deteriorating due to light leakage. The electrodeposited color filter of the invention provided with the lattice-shaped light shielding film used in the invention was manufactured by the manufacturing method described above.

(Embodiment 2)

Figure 6:
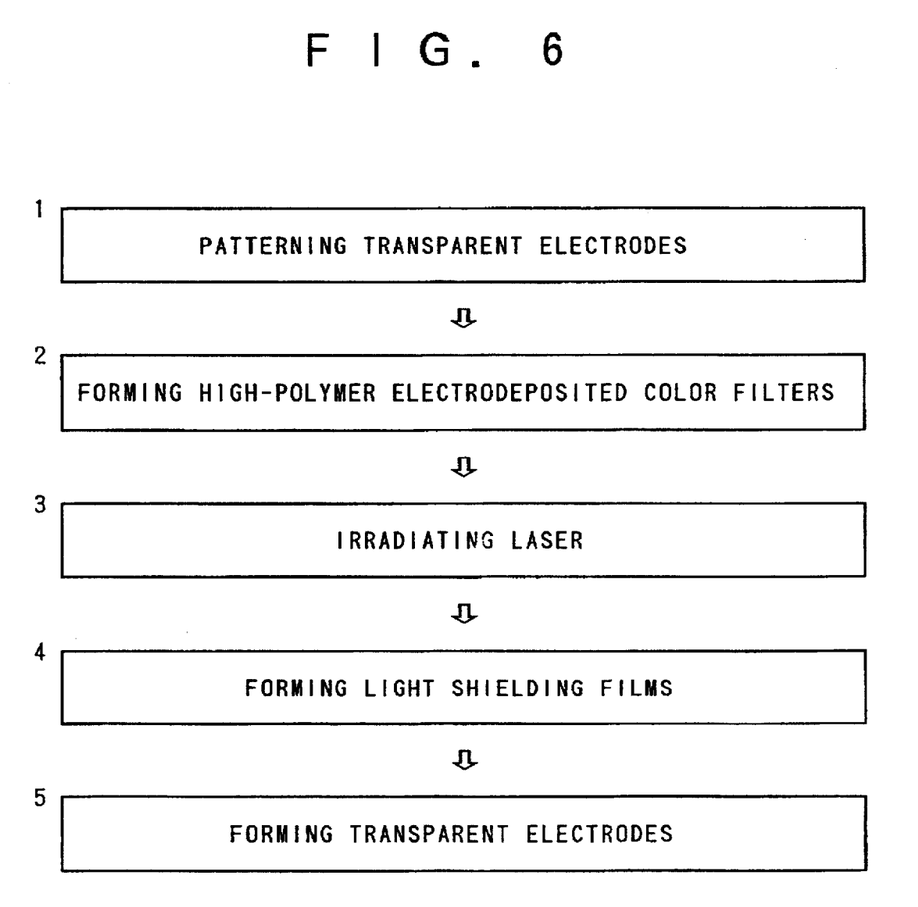
FIG. 6 is a flow chart showing another method for manufacturing color filters used in the invention.

FIG. 6 is a flow chart of manufacturing step showing one embodiment of the method for manufacturing color filters used in the multiple color liquid crystal display device of the invention.

In FIG. 6, the manufacturing step 1 shows a step of patterning a transparent electrode pattern 2 for forming an electrodeposited color filter formed on a glass substrate provided with ITO transparent electrodes by means of the YAG laser used in the first embodiment. The transparent electrode 2 was made by vacuum evaporation method to obtain a sheet resistance of 20Ω/□ and film thickness of 1500 Angstrom. The patterning of the transparent electrode 2 was carried out to obtain a stripe configuration similar to that shown in FIG. 1, although the shape may be arbitrary as far as the electrodeposited color filter can be formed.

Next the electrodeposited color filters 3R, 3G, 3B were formed on the transparent electrode pattern 2 similarly to the first embodiment. The film thickness of the electrodeposited filter was set to 1.2 micrometers for all colors. Then part of the electrodeposited color filter and part of the transparent electrode 2 were removed by means of a xenon laser (FLOROD LFA) similarly to the first embodiment.

Next a black resist was applied onto the surface of the electrodeposited color filter substrate to form a light shielding film having a film thickness of 1.2 micrometers similarly to the first embodiment. A transparent electrode having a sheet resistance of 50Ω/□ was installed on the surface of the electrodeposited color filter whereon a light shielding film 6 was formed, thereby completing an electrodeposited color filter substrate.

The multiple color liquid crystal display device of the invention was fabricated similarly to the first embodiment by using the color filter substrate and the TFT substrate, and no deterioration of the TFT element characteristic due to light leakage was observed at all. The electrodeposited color filter substrate described in this embodiment can be used in a multiple color liquid crystal display device of simple matrix type, by making the transparent electrode provided on the surface in a desired pattern.

(Embodiment 3)

Figure 7:
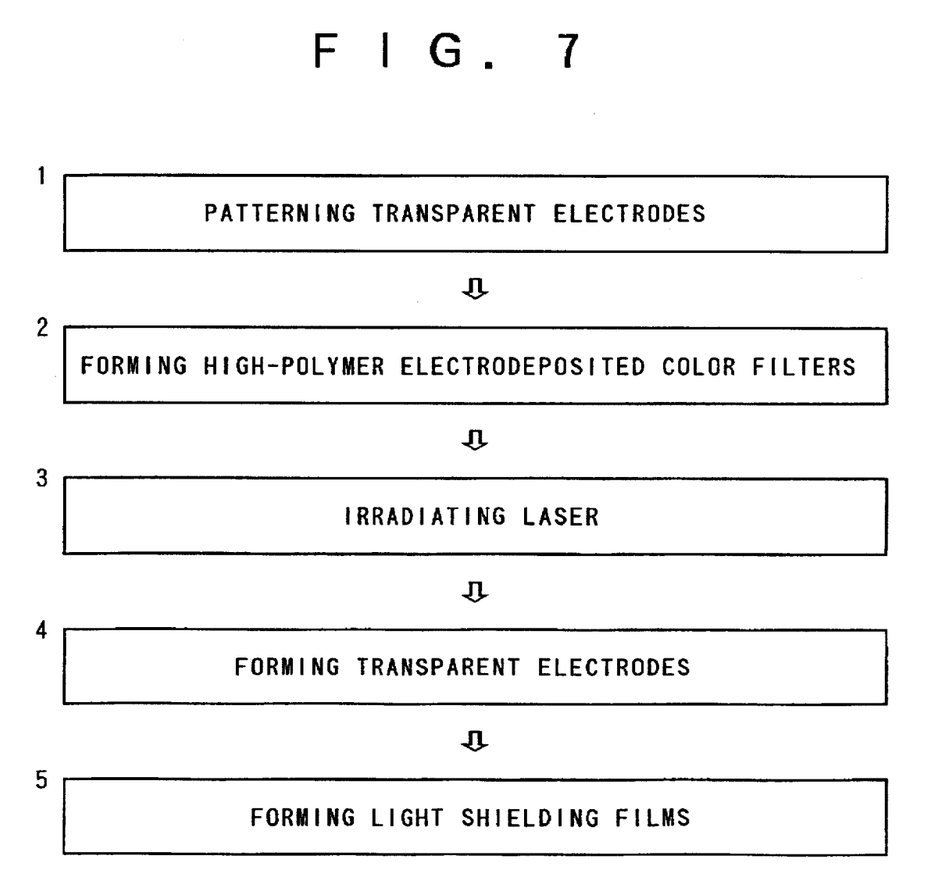
FIG. 7 is a schematic drawing showing another method for manufacturing color filters used in the invention.

FIG. 7 is a flow chart of manufacturing steps showing an embodiment of another method for manufacturing color filters used in the multiple color liquid crystal display device of the invention.

This embodiment is a variation of the first embodiment wherein the sequence of forming the transparent electrode in the manufacturing process 3 and laser irradiation in the manufacturing process 4 are interchanged, and is capable of manufacturing the color filter required by the invention similarly to the first embodiment because there is no problem even under the presence of the transparent electrode 4 which can be coped with by adjusting the output of the laser output.

The multiple color liquid crystal display device of the invention was fabricated similarly to the first embodiment by using the color filter substrate and the TFT substrate, and no deterioration of the TFT element characteristic due to light leakage was observed at all.

As described above, use of a laser makes it possible to form a lattice-shaped light shielding film which has been impossible to form with the color filter by means of the high-polymer electrodeposition method. Use of the electrodeposited color filter has made it possible to manufacture multiple color liquid crystal display devices which do not suffer from characteristic deterioration of active elements such as TFT elements due to light leakage.

The multiple color liquid crystal display device using the electrodeposited color filter which is a simplified manufacturing method can be made at lower cost than the multiple color liquid crystal display devices using color filters made by other manufacturing methods which require expensive manufacturing facilities and complicated processes.

What is claimed is:

1. A method of manufacturing a color filter, comprising the steps of:
    forming first transparent electrodes on a substrate;
    forming colored layers on the respective first transparent electrodes;
    forming second transparent electrodes over the respective colored layers;
    removing predetermined portions of the second transparent electrodes and the colored layers to form gaps between the colored layers; and
    forming a light shielding film in the gaps between the colored layers.

2. A method of manufacturing a color filter as claimed in claim 1; wherein the step of forming the colored layers comprises forming colored layers of different colors to form a multi-color filter.

3. A method of manufacturing a color filter as claimed in claim 2; wherein the color filter is formed by high-polymer electrodeposition.

4. A method of manufacturing a color filter as claimed in claim 2; wherein the removing step is performed with a laser.

5. A method of manufacturing a color filter as claimed in claim 2; wherein the light shielding film is formed by a back exposure method.

6. A method of manufacturing a color filter as claimed in claim 1; wherein the light shielding film has a lattice pattern.

7. A method of manufacturing a color filter as claimed in claim 1; wherein the removing step comprises removing portions of the first transparent electrodes at locations corresponding to the gaps between the colored layers.

8. A method of manufacturing a color filter as claimed in claim 1; wherein the step of forming the light shielding film comprises forming the light shielding film over the colored layers and in the gaps between the colored layers, and removing the light shielding film from over the colored layers but not from the gaps between the colored layers.

9. A method of manufacturing a color filter, comprising the steps of:
    forming first transparent electrodes on a substrate;
    forming colored layers on the respective first transparent electrodes;
    removing predetermined portions of the colored layers and the first transparent electrodes to form gaps between the colored layers;
    forming a light shielding film over the colored layers and in the gaps between the colored layers; and
    removing the light shielding film over the colored layers.

10. A method of manufacturing a color filter as claimed in claim 9; including the step of forming second transparent electrodes over the light shielding film.

11. A method of manufacturing a color filter as claimed in claim 10; wherein the light shielding film has a lattice pattern.

12. A method of manufacturing a color filter as claimed in claim 9; including the step of forming second transparent electrodes over the respective colored layers after the removing step and before the step of forming the light shielding film.

13. A method of manufacturing a color filter as claimed in claim 12; wherein the first transparent electrodes and colored layers are formed in a stripe pattern with lengthwise extending gaps between each two adjoining colored layers and underlying first transparent electrodes; and wherein the removing step comprises removing portions of the colored layers and underlying first transparent electrodes along the lengths thereof to thereby form a lattice pattern of gaps.

14. A method of manufacturing a color filter as claimed in claim 9; wherein the light shielding film has a lattice pattern.

15. A method of manufacturing a color filter as claimed in claim 9; wherein the step of forming the colored layers comprises forming colored layers of different colors to form a multi-color filter.

16. In a method of manufacturing a multiple color liquid crystal display device, the improvement comprising the steps of:
    forming first transparent electrodes on a substrate;
    forming colored layers on the respective first transparent electrodes;
    forming second transparent electrodes over the respective colored layers;
    removing predetermined portions of the colored layers and the second transparent electrodes to form gaps between the colored layers; and
    forming a light shielding film in the gaps between the colored layers.

17. A method as claimed in claim 16; wherein the step of forming the colored layers comprises forming colored layers of different colors to form a multi-color filter.

18. A method as claimed in claim 17; wherein the color filter is formed by high-polymer electrodeposition.

19. A method as claimed in claim 17; wherein the removing step is performed with a laser.

20. A method as claimed in claim 17; wherein the light shielding film is formed by a back exposure method.

21. A method as claimed in claim 16; wherein the light shielding film has a lattice pattern.

22. A method as claimed in claim 16; wherein the colored layers are formed by high-polymer electrodeposition, the removing step is performed with a laser, and the light shielding film is formed by a back exposure method.

23. A method as claimed in claim 16; wherein the removing step comprises removing portions of the first transparent electrodes at locations corresponding to the gaps between the colored layers.

24. A method of manufacturing a color filter as claimed in claim 16; wherein the step of forming the light shielding film comprises forming the light shielding film over the colored layers and in the gaps between the colored layers, and removing the light shielding film from over the colored layers but not from the gaps between the colored layers.

* * * * *